Nov. 21, 1939.  A. H. VAUGHAN  2,180,376
CONTROLLED ATMOSPHERE HEAT TREATMENT
Filed July 6, 1937
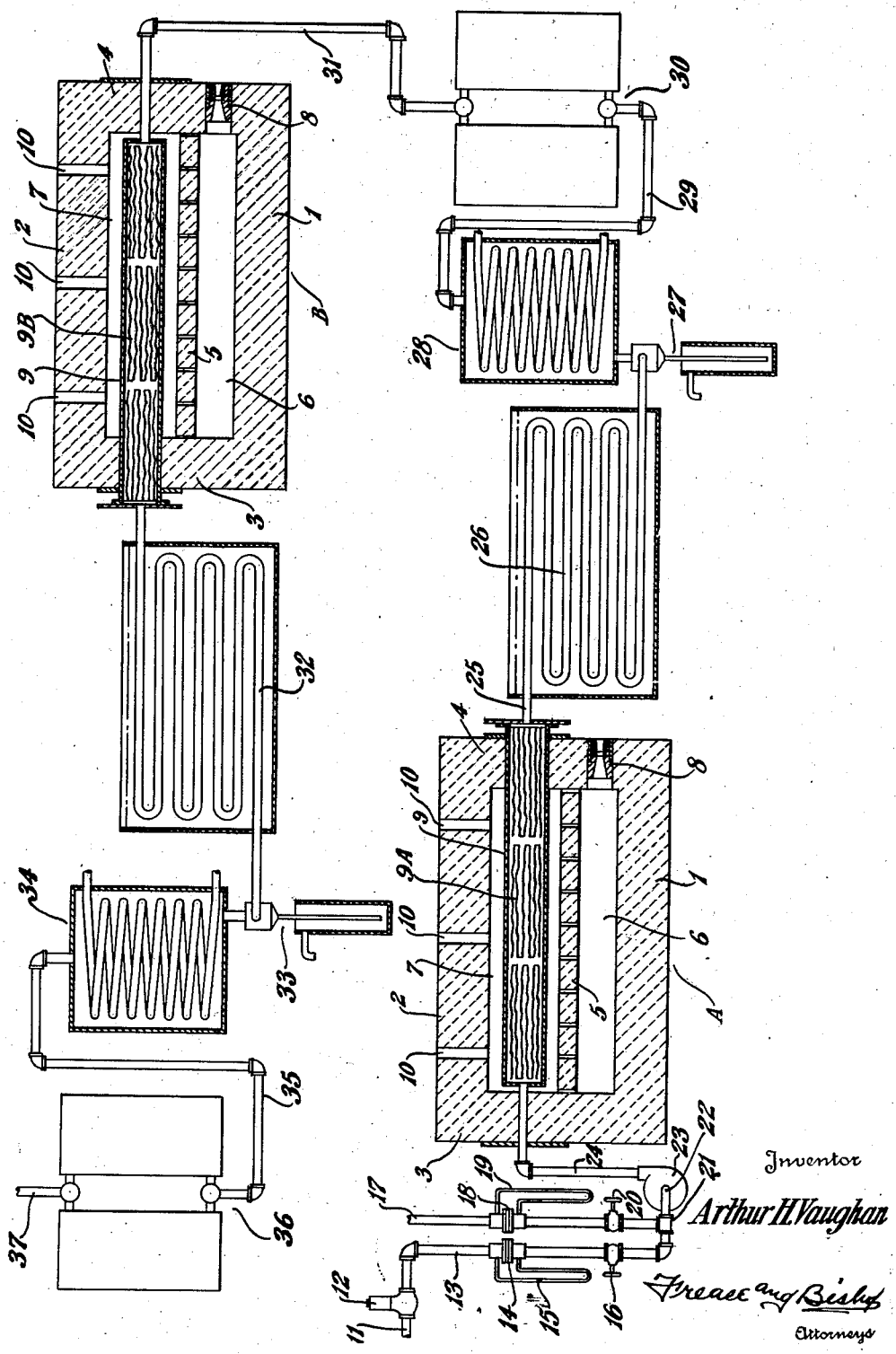

Patented Nov. 21, 1939

2,180,376

UNITED STATES PATENT OFFICE 2,180,376

CONTROLLED ATMOSPHERE HEAT TREATMENT

Arthur H. Vaughan, Salem, Ohio, assignor to The Electric Furnace Company, Salem, Ohio, a corporation of Ohio Application July 6, 1937, Serial No. 151,995

6 Claims. (Cl. 148—16)

The invention relates generally to furnaces and is particularly applicable to special or controlled atmosphere furnaces which are used for the heating or heat treatment of ferrous or non-ferrous metals or alloys, or metal products made from such metals or alloys. More particularly, the invention relates to the heat treatment, as by annealing, normalizing or hardening, of ferrous metals, particularly steels and especially those of relatively high carbon content.

Special or controlled atmosphere furnaces are extensively used for the heat treatment of ferrous or non-ferrous metals or alloys or products thereof; and such furnaces may be electrically heated, gas fired, radiant tube heated, or heated by any other means, so long as the desired particular or special atmosphere is maintained or controlled within the furnace chambers, zones or compartments.

In carrying out such heat treating operations, the metals being treated are subjected to temperatures at which oxidation of the metal will take place if in contact with air, and the temperatures are likewise high enough that de-carburization of the metals will take place if the furnace atmosphere is of such character as to promote de-carburization.

Accordingly, the invention relates to the provision and use of a special or controlled atmosphere for a heat treating furnace, which atmosphere functions as a protective gas and is used to envelop the metal products being heated in the furnace for preventing oxidation or de-carburization of the metal while being treated.

The increasingly extensive use of controlled atmosphere furnaces for the heat treatment of metals, particularly ferrous metals, has encountered very complex problems due to the large number of variables which are ever present. These variables include, among others, the heat treating temperatures utilized; the analysis or composition of the metal articles being treated; the composition and character of available gases used for enveloping and protecting the materials, or used for preparing a special gas for enveloping and protecting the materials; and the cost of preparing a special enveloping gas having particular properties.

Certain of these problems are explained in and satisfied by the heat treatment set forth in the W. S. Bowling Patent No. 1,979,820, dated November 6, 1934; but the special gases prepared in the manner set forth therein have been found to be decarburizing rather than non-decarburizing in carrying out annealing, normalizing or hardening operations upon certain steel products, especially those of relatively high carbon content.

It is therefore a general object of the present invention to provide a manner of preparing a non-decarburizing atmosphere for use in special or controlled atmosphere heat treating furnaces.

It is a further object of the present invention to provide simple and dependable means for producing such a non-decarburizing atmosphere for use in a controlled atmosphere heat treating furnace.

Moreover, it is an object of the present invention to provide for the inexpensive manufacture of a non-decarburizing atmosphere for use in a controlled atmosphere heat treating furnace, so that the prepared gas, which is constantly supplied to and constantly used up by loss from the furnace, is relatively cheap.

As stated in said Bowling Patent No. 1,979,820, when one or more of certain hydrocarbons or gases having fairly large hydrocarbon contents, such as, for example, natural gas available at many places, manufactured gas, water gas, kerosene, propane, and butane, are mixed with air in certain predetermined proportions, and the mixture caused to react in a primary reaction chamber maintained at certain temperatures, the products of the reaction contain a certain quantity of carbon dioxide, water vapor, hydrogen, carbon monoxide, nitrogen, and some undissociated hydrocarbons, usually methane ($CH_4$) and perhaps some $C_2H_6$.

I have discovered that if, after removal of all or substantially all of the water vapor, these products of such a primary reaction are again caused to react in a second reaction chamber at certain temperatures, the undissociated hydrocarbons present in the products of the primary reaction may be utilized as a means of eliminating all or substantially all of the undesirable carbon dioxide, which is decarburizing in effect; so that the products of the second reaction contain only a very small amount of carbon dioxide, no more than traces of oxygen, large quantities of hydrogen, carbon monoxide and nitrogen, some undissociated hydrocarbons, and in most cases no water. However, under some conditions of operation which are satisfactory for certain treatments, it is permissible to have some water result from the second reaction, providing that this is substantially removed before delivery of the gas mixture to the heat treating furnace.

It is therefore a further object of the present invention to prepare a special atmosphere for use in a controlled atmosphere heat treating furnace from material having a considerable hydrocarbon content by primarily reacting the same with a predetermined amount of air at a predetermined temperature to produce a rich reducing gas having considerable quantities of undissociated hydrocarbons therein; and then utilizing the undissociated hydrocarbons in the products of the primary reaction to eliminate undesirable carbon dioxide from the products of the primary reaction by causing the dried products of the primary reaction to react in a secondary reaction chamber to produce a rich reducing gas which is non-decarburizing.

And finally, it is an object of the present invention to provide for the heat treatment, as by annealing, normalizing or hardening, of ferrous metals, particularly steels, and especially those of relatively high carbon content, in a special atmosphere which will prevent oxidation or decarburization of the steel.

The foregoing and other objects may be obtained by the methods, steps, processes, treatments, and furnace operation, which comprise the present invention, the nature of which is set forth in the following general statements and in the following description, and which is particularly and distinctly pointed out and set forth in the appended claims forming part hereof.

The nature of the improvements of the present invention may be described in general terms as including providing a gas having a considerable hydrocarbon content, causing a predetermined quantity of the gas to react with a predetermined quantity of air, preferably in the presence of a catalyst, to produce reaction products containing carbon dioxide, water vapor and undissociated hydrocarbons; controlling the temperature at which said reaction is being carried out to control the amount of undissociated hydrocarbons present in the reaction products; removing all, or at least a part, of the water vapor present in said reaction products; reheating the said dried reaction products to cause a reaction between the carbon dioxide and undissociated hydrocarbons to eliminate substantially all of the carbon dioxide and provide a reducing, non-decarburizing gas; and using the gaseous products in the heat treating chamber of a heat treating furnace as an enveloping and protecting atmosphere for the material being heat treated therein.

By way of example, the figure of the accompanying drawing forming part hereof, shows diagrammatically certain apparatus which may be used in manufacturing the special reducing and non-decarburizing gaseous products for use in a heat treating furnace in accordance with the present invention.

Similar numerals refer to similar parts throughout the drawing.

A primary gas converter is indicated generally at A and a secondary gas converter is indicated generally at B. The converters A and B are muffle type furnaces and may be electrically heated, or gas fired as shown, or heated in any other suitable manner.

As shown, each converted A and B may include a lower wall 1, and an upper wall 2 and end walls 3 and 4; and an openwork partition wall 5 may extend between the end walls 3 and 4 spaced from the lower wall 1 and upper wall 2 to form a combustion chamber 6 and a heating chamber 7. A gas burner 8 may be provided which is supplied with fuel from any suitable source; and the fuel burns in chamber 6 and the products therefrom pass through the checkered hearth wall 5 and heat the retort 9 in heating chamber 7. Flues 10 may be provided leading from the heating chamber; and suitable thermocouples, not shown, may communicate with the heating chamber 7 and be connected with suitable control devices whereby the temperature of the heating chamber 7 may be maintained at any predetermined degree in a well known manner.

Retort 9 is preferably a tubular member, preferably filled with expanded nickel sheets, which act as a catalyst. Retort 9 in gas converter A forms a primary reaction chamber 9A and retort 9 in gas converter B forms a secondary reaction chamber 9B.

A hydrocarbon containing gas may be supplied through pipe 11 provided with a pressure regulator 12 to pipe 13, which is provided with an orifice 14, a flow meter 15 and valve 16. Air may be supplied through pipe 17 also provided with an orifice 18, a flow meter 19 and a valve 20. Pipes 13 and 17 may then be joined as at 21 to communicate with the intake side 22 of a blower or pump 23, which discharges through pipe 24 into the primary reaction chamber 9A. The orifices 14 and 18, flow meters 15 and 19, and valves 16 and 20 are provided for enabling any desired or predetermined ratio of air to gas to be supplied to the primary reaction chamber.

The products of the reaction between the air and gas admitted into the reaction chamber 9A pass off through pipe 25, through a cooler indicated generally at 26, through a water sealed water trap indicated generally at 27, then preferably through a refrigeration device indicated generally at 28, and by pipe 29 to a double absorption drier indicated generally at 30. Moisture condensed from the products of the primary reaction chamber in the cooler 26 and refrigeration device 28 collects in and is removed by water sealed water trap 27. The operation of the double absorption drier 30 is well known in that one side is in use while the other side is being reactivated.

The cooled dried products of the primary reaction chamber are then led through pipe 31 to secondary reaction chamber 9B in converter B, wherein the temperature is maintained at a predetermined value in the manner previously described and the products therefrom likewise pass through a cooler 32, a water sealed water trap 33, a refrigerant device 34 and pipe 35 to another double absorption drier 36. Devices 32, 33, 34, 35 and 36 may each be similar to devices 26, 27, 28, 29 and 30. The dry gaseous products of the secondary reaction chamber 9B may then be led by pipe 37 to any suitable storage container, or to a special atmosphere heat treating furnace in which the gaseous products are to be used as a protective enveloping atmosphere.

Specific examples of the analysis of the products of the primary and secondary reaction chambers 9A and 9B resulting in carrying out the improved methods are as follows:

Salem, Ohio, natural gas containing about 84.6% methane, 13.4% ethane and 2% nitrogen was introduced into the primary reaction chamber 9A, mixed with air in the ratio of 4 parts of air by volume to 1 part of gas. The temperature in the reaction chamber was maintained at about 1850° F. and expanded sheet nickel was used as a catalyst. The gases produced in the reaction chamber 9A were analyzed to determine their composition and found to be as follows on a dry basis:

Table I

| | |
|---|---|
| $CO_2$ | 5.2 |
| $O_2$ | 0 |
| $H_2$ | 13.8 |
| $CO$ | 9.9 |
| $CH_4$ | 6.1 |
| $N_2$ | 65.0 |
| | 100.0 |

The analysis of Table I of course does not show the water vapor present in the products of the primary reaction chamber, but this water vapor is removed in devices 26, 28 and 30 and the analysis of Table I therefore represents the analysis of the cooled dried gases passing through pipe 31 into reaction chamber 9B.

Table I shows that the amount of undissociated hydrocarbons, $CH_4$, is at least as much as and in fact is in excess of the amount of $CO_2$ present on a dry basis; so that there is a sufficient amount of undissociated hydrocarbons present in the products of the primary reaction to substantially eliminate the $CO_2$ during the secondary reaction.

The secondary reaction chamber 9B was maintained at a temperature of approximately 1850° F. and expanded nickel sheet metal was again used as a catalyst. The products of the secondary reaction chamber 9B were analyzed to determine their composition and the same is presented in Table II below:

Table II

| | |
|---|---|
| $CO_2$ | 0.2 |
| $O_2$ | 0 |
| $H_2$ | 22 |
| $CO$ | 17.6 |
| $CH_4$ | 0.9 |
| $N_2$ | 59.3 |
| | 100.0 |

The products of the secondary reaction chamber 9B thus are rich in hydrogen, carbon monoxide, and contain a small amount of methane, so that the same is a rich reducing gas, while only two-tenths of 1 percent of carbon dioxide is present therein, which is a decarburizing agent. Under the particular conditions just described substantially no water vapor was formed in the secondary reaction chamber 9B.

If the small amount of carbon dioxide present, as shown in Table II, is still too much, so as to render the gas decarburizing, the same may be removed by passing the gas in pipe 37 through a usual carbon dioxide absorption device, which of course can be inexpensively operated for the removal of such a small amount of carbon dioxide.

For comparative purposes, a second example is given below in Tables III and IV, utilizing the same initial gas containing 84.6% methane, 13.4% ethane and 2% nitrogen under slightly different conditions. The gas was mixed with air in the ratio of 3.6 parts of air by volume to 1 of gas and introduced into the primary reaction chamber 9A and the primary reaction chamber 9A was maintained at about 1500° F. The products of the primary reaction chamber on a dry basis are given in Table III as follows:

Table III

| | |
|---|---|
| $CO_2$ | 5.2 |
| $O_2$ | .5 |
| $H_2$ | 8.1 |
| $CO$ | 7.2 |
| $CH_4$ | 13.6 |
| $N_2$ | 65.4 |
| | 100.0 |

As was the case in the first example, in the second example as shown in Table III, the amount of undissociated hydrocarbons, $CH_4$, is at least as much as and in fact is in excess of the $CO_2$ present on a dry basis; so that there is a sufficient amount of undissociated hydrocarbons present during the secondary reaction to substantially eliminate the $CO_2$.

The products of Table III, when cooled and dried were then introduced into the secondary reaction chamber 9B maintained at 1950° F. and the products of the secondary reaction chamber on a dry basis are given in Table IV as follows:

Table IV

| | |
|---|---|
| $CO_2$ | 1.0 |
| $O_2$ | 0 |
| $H_2$ | 17.0 |
| $CO$ | 15.1 |
| $CH_4$ | 7.3 |
| $N_2$ | 59.6 |
| | 100.0 |

Again, the products of the secondary reaction chamber in this example are richly reducing by containing substantial amounts of hydrogen, carbon monoxide and methane, while only a small amount of carbon dioxide is present, which if too large, can be readily and inexpensively removed in an organic carbon dioxide absorption device as previously stated.

In comparing the two examples, it is seen that by lowering the temperature at which the primary reaction is carried out, more undissociated hydrocarbons are present in the products of the primary reaction. This may be desirable under many conditions in order to provide more undissociated hydrocarbons for reacting in the secondary reaction chamber with the undesirable carbon dioxide.

This is also desirable because under such circumstances the products of the secondary reaction also contain substantial amounts of undissociated hydrocarbons and when the products of the secondary reaction contain a relatively high percentage of undissociated hydrocarbons, as indicated in Table IV, the hydrocarbons serve, not only to counteract the effect of even appreciable amounts of carbon dioxide which may be in the products (see Table IV) upon introduction of the gas mixture into a heat treating furnace, but also serve to counteract the effect of any oxygen introduced into the furnace, as through the medium of oxidized metal and the like.

The air requirement for perfect combustion of Salem natural gas is 10.3 to 1 so that in the two examples given the air-gas ratios of the air and gas introduced into the primary reaction chamber of 4 to 1 and 3.6 to 1 give air contents lying within the range of about 30 to 50% of that required for perfect combustion. These ratios may however be anywhere from 3 to 1 to 5 to 1 for Salem natural gas.

It is likewise possible to carry out the present method with Salem natural gas by using a 5 to 1 to 7 to 1 air-gas ratio, but in so doing, more nearly perfect combustion is approached in the primary reaction chamber and therefore the temperature cannot be regulated satisfactorily to leave much undissociated hydrocarbons in the products of the primary reaction chamber.

Likewise, there is a relatively large amount of carbon dioxide present in the products of the primary reaction chamber, which demands a large amount of undissociated hydrocarbons in order to eliminate the carbon dioxide in the secondary reaction chamber. Such hydrocarbons may, however, be supplied by bleeding in some additional hydrocarbon-containing gas into pipe 31 just ahead of the secondary reaction chamber to supply the necessary hydrocarbons for eliminating the carbon dioxide when working on a 6 to 1 or 7 to 1 air-gas ratio.

This alternative procedure may, however, be preferable in some instances where it is desired to avoid the use of external heat for heating the primary reaction chamber.

Referring again to the two examples given above in Tables I to IV, the protective gas produced thereby has been found to be non-decarburizing when used in connection with heat treating steel clutch plates having an .80% carbon content at a temperature of approximately 1475° F.

Accordingly, the improved process can be carried out with gases similar to Salem natural gas by using an initial air-gas ratio of from 3 to 1 to 5 to 1; or by using an air-gas ratio of above 5 to 1 to say 7 to 1 with the bleeding of additional hydrocarbon-containing gas into the system just prior to the secondary reaction chamber. The primary reaction chamber may be maintained at a temperature of say 1400° F. to 2000° F., the lower the temperature, the more undissociated hydrocarbons are present in the products of the primary reaction chamber.

The secondary reaction chamber may be maintained at a temperature of say from 1800° F. to 2000° F. A dioxide adsorption device may be used if the small amount of carbon dioxide which may remain in some instances in the products of the secondary reaction chamber is too much.

Although the invention is of course applicable to heat treating processes in general, it is particularly applicable to the heat treatment of high carbon steels where it is desirable or necessary to prevent decarburizing. Of course, hydrocarbons other than the Salem natural gas indicated in the examples may be used, and the temperatures and air ratios varied accordingly, in order to produce products of the primary reaction rich in reducing constituents and containing considerable undissociated hydrocarbons.

Thus, other hydrocarbons require different air-gas ratios for perfect combustion and the air-gas ratio used in carrying out the present process will be that required to produce about 30 to 50% of perfect combustion, or about 50 to 70% of perfect combustion with the bleeding in of additional gas.

In the claims, the term "hydrocarbon-containing gas" is intended to include not only a gas which is normally gaseous, but also a hydrocarbon containing material which may be normally liquid, such as gasoline or kerosene, but which may be vaporized by heating in order to mix with air for admission to the primary reaction chamber.

It is not absolutely essential in all cases to use all of the drying elements 26, 28, 30, 32, 34 and 36. In actual operation, the double absorption drier 30 has been eliminated and also the refrigeration device 34 and the double absorption drier 36. If any of these absorption or refrigeration devices are left out, it may be necessary to run the primary reaction chamber with a little richer air-gas mixture, or at a little lower temperature.

It may be stated that small amounts of water vapor or carbon dioxide present in the products resulting from the secondary reaction chamber do not cause any difficulties in carrying out certain heat treating operations, as in the case of a low temperature annealing operation where the presence of slight amounts of water vapor or carbon dioxide in the enveloping and protecting gas would be innocuous.

I claim:

1. In a method of heat treating, the steps of reacting a hydrocarbon-containing gas with air in predetermined proportions to provide reaction products containing carbon dioxide, water vapor and undissociated hydrocarbons in excess of the amount of carbon dioxide, removing at least a part of the water, reheating the remaining reaction products to about 1800° F. to 2000° F. to react the carbon dioxide and undissociated hydrocarbons and provide a non-decarburizing gas, and utilizing said non-carburizing gas as an enveloping and protecting atmosphere in a heat treating furnace.

2. In a method of heat treating, the steps of reacting a hydrocarbon-containing gas with air in predetermined proportions in the presence of a heated catalyst to provide reaction products containing carbon dioxide, water vapor and undissociated hydrocarbons in excess of the amount of carbon dioxide, removing at least a part of the water, reheating the remaining reaction products to about 1800° F. to 2000° F. in the presence of a catalyst to react the carbon dioxide and undissociated hydrocarbons and provide a non-decarburizing gas, and utilizing said non-decarburizing gas as an enveloping and protecting atmosphere in a heat treating furnace.

3. In a method of heat treating, the steps of reacting a hydrocarbon-containing gas with air in predetermined proportions to provide reaction products containing carbon dioxide, water vapor and undissociated hydrocarbons, controlling the temperature of the reaction to control the amount of undissociated hydrocarbons to be at least as much as the amount of carbon dioxide present in said reaction products, drying the reaction products, reheating the dried products to about 1880° F. to 2000° F. to react the carbon dioxide and undissociated hydrocarbons and provide a non-decarburizing gas, and utilizing said non-decarburizing gas as an enveloping and protecting atmosphere in a heat treating furnace.

4. In a method of heat treating, the steps of reacting air and a hydrocarbon-containing gas in such ratio as to result in about 30 to 50% of perfect combustion at temperatures of about 1400° F. to 2000° F. to provide reaction products containing carbon dioxide, water vapor and undissociated hydrocarbons, varying the air-gas ratio and the temperature at which the reaction is carried out to control the amount of undissociated hydrocarbons to be at least as much as the amount of carbon dioxide present in the products of said reaction, removing at least a part of the water, reheating the remaining reaction products to react the carbon dioxide and undissociated hydrocarbons at a temperature of about 1800° F. to 2000° F. to provide a nondecarburizing gas, and utilizing said non-decarburizing gas as an enveloping and protecting atmosphere in a heat treating furnace.

5. In a method of heat treating, the steps of reacting air and hydrocarbon-containing gas in such ratio as to result in about 50 to 70% of perfect combustion to provide reaction products containing carbon dioxide, water vapor and small amounts of undissociated hydrocarbons, removing at least a part of the water, mixing an additional amount of hydrocarbon-containing gas with the dried products of said reaction to supply sufficient amount of hydrocarbons to subsequently substantially eliminate the carbon dioxide, reheating the same to about 1800° F. to 2000° F. to react the carbon dioxide and hydrocarbons and provide a non-decarburizing gas, and utilizing said non-decarburizing gas as an enveloping and protecting atmosphere in a heat treating furnace.

6. In a method of heat treating, the steps of reacting a hydrocarbon-containing gas with air in an amount approaching that sufficient to support complete combustion to produce reaction products containing carbon dioxide and water vapor, drying said reaction products, mixing additional hydrocarbon-containing gas with said dried reaction products to supply sufficient amount of hydrocarbons to subsequently substantially eliminate the carbon dioxide, reacting the carbon dioxide and hydrocarbon-containing gas at about 1800° F. to 2000° F. to provide a non-decarburizing gas, and utilizing said non-decarburizing gas as an enveloping and protecting atmosphere in a heat treating furnace.

ARTHUR H. VAUGHAN.

CERTIFICATE OF CORRECTION.

Patent No. 2,180,376.

November 21, 1939.

ARTHUR H. VAUGHAN.

It is hereby certified that error appears in the printed specification of the above numbered patent requiring correction as follows: Page 2, first column, line 56, for the word "converted" read converter; line 57, for "and an" read an; page 4, second column, line 14, claim 1, for "non-carburizing" read non-decarburizing; line 19, claim 2, for "predetermining" read predetermined; line 40, claim 3, after "dried" insert reaction; line 41, same claim, for "1880° F." read 1800° F.; and that the said Letters Patent should be read with this correction therein that the same may conform to the record of the case in the Patent Office.

Signed and sealed this 12th day of March, A. D. 1940.

(Seal)

Henry Van Arsdale,
Acting Commissioner of Patents.